3,463,735
GLASS CLEANING COMPOSITION

Melvin E. Stonebraker, Cincinnati, and Samuel P. Wise, Kenwood, Syracuse Township, Cincinnati, Ohio, assignors to The Drackett Company, Cincinnati, Ohio, a corporation of Delaware
No Drawing. Continuation-in-part of application Ser. No. 370,079, Mar. 25, 1964. This application Oct. 18, 1967, Ser. No. 676,084
Int. Cl. C11d 7/50
U.S. Cl. 252—137                 12 Claims

ABSTRACT OF THE DISCLOSURE

Improves the effectiveness of a glass cleaning composition of the type containing (a) a solvent system consisting of a mixture of a low boiling solvent (e.g., aliphatic alcohols) and a moderately higher boiling solvent (e.g., alkylene or polyalkylene glycols or their ethers), and (b) a surfactant by adding to said composition an alkali-metal polyphosphate; in a preferred form of the invention, ammonia is also added.

---

This application is a continuation-in-part of application Ser. No. 370,079, filed Mar. 25, 1964 and now abandoned.

This invention relates to a liquid composition for cleaning glass and like smooth, reflective, hard surfaces, such as those of a vitreous or ceramic nature, including tile and porcelain, for example, or even metallic origin, including stainless steel and brushed or polished chrome.

Whether by reason of an actual enhanced susceptability to soiling because of static electricity or some similar phenomenon, or merely an appearance rendering normal soiling more conspicuous, glass and other polished hard surfaces are notoriously difficult, not only to clean without streaking or spotting, but to maintain in clean condition. Far more, apparently, than with other kinds of surfaces, ordinary human activity in proximity to glass surfaces and the like, as in the household or automobile, seems to result in either the accumulation of a haze or film or the deposition of dirt particles on such surfaces. It is not surprising, therefore, that considerable attention has been devoted to the problem of cleaning these surfaces. From well-known household remedies based on aqueous solutions of vinegar or ammonia, the art has progressed to scientifically devised formulations containing a carefully selected blend of polar organic solvents with water and usually including a surface-active agent. One example of such a formulation is U.S. Patent 2,386,106 to Gangloff, issued Oct. 2, 1945.

As the just-identified patent indicates, the characteristics of a satisfactory cleaning composition of the type in question, which dictate the selection of its components, are considerably more complex than appearances might suggest. Thus, along with the obvious need of good detersive qualities, a sufficiently low evaporation rate to permit easy spreading, even in hot weather, but not so low as to require prolonged mopping for thorough removal, combined with fast wicking into ordinary toweling are quite important. In order to provide these characteristics, the practice of the art more precisely has been to combine a low boiling polar solvent, such as one of the simple alcohols, with a somewhat higher boiling polar solvent, such as a glycol or glycol ether for proper fluidity, and to add one or more anionic or non-ionic surface-active agents to promote detergency and wicking.

In the course of manufacturing and selling a product of the type just described over a considerable period of time, there were received reports from customers alluding in an ill-defined way to some loss in effectiveness of certain samples of the product purchased by them through usual commercial channels. It has now been established that this loss of effectiveness is attributable to the fact that there is a reduction in micelle formation on the addition of said alcohol-glycol solvent system to the aqueous solution of the surfactant with the consequent reduction in the solubility of the surfactant. This in turn reduces the ability of the surfactant to function at its maximum.

The above is made evident by two types of experimental data. It has been observed that simple aqueous solutions of surfactants used in the present invention do not exhibit any substantial Tyndall effect when exposed to a Tyndall beam, and accordingly no substantial haze is observed in the solution. The same is true of the alcohol-glycol organic solvent system employed herein. However, when this solvent system is added to the aqueous solutions of surfactant, there is a decided increase in the haze which is visible when this solution is subjected to the Tyndall beam. This indicates an increase in suspended particles of undissolved surfactant in the liquid.

It has also been found that the addition of said organic solvent system to the aqueous solutions of the surfactants decrease its fat film removal capabilities. This is consistent with the Tyndall effect observations made above, since decreasing the solubility of the surfactant in the solution would also tend to decrease its ability to remove fat films from a surface.

Although the addition of the organic solvent system to the aqueous surfactant has a negative effect on the ability of the latter to remove fat film, as mentioned above, it is highly desirable to have this organic solvent system in a cleaning composition because of the other desirable characteristics it adds to the composition. The problem, therefore, was to re-establish as much as possible the effectiveness of the surfactant in the presence of the organic solvent system.

It has now been found that the loss of effectiveness of the surfactant in cleaning compositions containing the alcohol-glycol solvent systems can be obviated by the addition thereto of a polyphosphate or molecularly dehydrated phosphate salt, preferably in conjunction with a small quantity of ammonia dissolved therein, provided the aqueous component is substantially free from calcium and magnesium ions.

The basic composition which serves as the context for the improvement of the present invention consists essentially of at least one relatively low boiling, lower aliphatic alcohol, at least one lower alkylene or polyalkylene glycol or lower alkyl ether thereof, of moderately higher boiling point than the aliphatic alcohol, and at least one compatible surface-active agent, all mixed in minor proportions in water. Among the lower aliphatic alcohols suitable for use in the present composition may be mentioned those having from 2–4 carbon atoms and a boiling point within the range of about 75–100° C. Representative members of this class are set forth below, together with their boiling points.

| Low boiling solvent: | Boiling point ° C. |
|---|---|
| Isopropyl alcohol | 82.3 |
| n-Propyl alcohol | 97.2 |
| Ethyl alcohol | 78.5 |
| Sec-butyl alcohol | 99.5 |
| Tert-butyl alcohol | 82.8 |

Among the materials in the preceding list, isopropyl alcohol is readily available in bulk quantities at relatively low cost and is preferred. Ethyl alcohol is essentially a full equivalent as regards desirable properties but is less advantageous from a practical point of view by reason of the strict governmental restrictions attending its use requiring careful accounting of the amounts utilized, as well as some form of adulteration to prevent human consumption. Methyl alcohol has a boiling point below the stated range and tends to be too highly evaporative for the needs of this invention. At the other extreme, normal butyl alcohol is well above the limit of 100° C. and, for that reason, is more closely related to the category of alcohols next to be discussed. A suitable amount of the lower alcohol is about 0.5–5% by weight, with at least about one percent being preferred. Two or more compounds within this class can be combined, if desired.

As the higher boiling component of the composition, one can employ at least one solvent selected from the group consisting of alkylene and polyalkylene glycols containing about 2–6 carbon atoms and the $C_{1-4}$ lower alkyl ethers of alkylene and polyalkylene glycols containing a total of about 3–8 carbon atoms. In order to minimize undue extension of the rate of evaporation, the higher boiling solvent should have a boiling point in the approximate range of 120–250° C. A representative list of suitable compounds in this category is set forth below, together with the corresponding boiling point values in order to facilitate a choice of specific compounds.

| High boiling solvent: | Boiling point ° C. (at atmospheric pressure) |
|---|---|
| Ethylene glycol | 197.2 |
| Propylene glycol | 189 |
| Trimethylene glycol | 214 |
| 1,2-butanediol | 192 |
| 1,3-butanediol | 204 |
| Tetramethylene glycol | 230 |
| 1,2-pentanediol | 212 |
| 1,4-pentanediol | 212 |
| Pentamethylene glycol | 239 |
| 2,3-hexanediol | 207 |
| Hexamethylene glycol | 250 |
| Glycol monoethyl ether | 135 |
| Glycol monobutyl ether | 171 |
| Glycol monomethyl ether | 124 |
| Propylene glycol monoethyl ether | 120 |
| Diethylene glycol monoethyl ether | 202 |

From among the group of compounds just given, glycol monobutyl ether and propylene glycol monomethyl ether have been found to give notably good results, particularly when combined with isopropyl alcohol. The amount of the higher boiling component may equal about 0.5–5% by weight, again with at least about 1% being preferred. If desired, a combination of two or more higher boiling compounds can be employed, in which event, the total of their weights is within the range just recited. While it is not normally necessary to include more than one of the higher boiling materials, sometimes a blend will be found to give the best compromise between good lubricity and optimum rate of evaporation to suit the requirements of a particular climatic situation. It is to be understood, of course, that not all combinations of all higher boiling and low boiling solvents within the classes described above give optimum performance in all respects. They will, however, be found to be acceptable from an overall standpoint.

By virtue of the limits on the maximum permissible amount of non-aqueous solvents set forth above, the compositions of this invention are entirely free, for all practical purposes, of risks of inflammability. In addition to this advantage, the relatively low proportion of non-aqueous solvents favors increased efficiency of the surface-active agents and, as a matter of fact, it is preferred that the solvent content be even less than the above limit for this very reason. About 6% has been found to be a desirable preferred upper limit for the combined solvents, constituted by from about 30%–75% of the simple alcohol and the remainder of the higher boiling component.

As far as can now be determined, any surface active agent compatible with the solvent system as hereinbefore defined can be employed and as the choice of appropriate materials will be obvious to one skilled in the art by reason of the considerable experience the art has now acquired in this practice, an elaborate discussion of the types and characteristics of appropriate surface active agents is thought to be unnecessary. In general, any anionic or non-ionic surface-active agent will give reasonably satisfactory results in the present composition as will, no doubt, certain amphoteric agents. Within these broad classes, mention may be made of the sulfonated fatty alcohols containing from about 8–18 carbon atoms or more, sulfated fatty oils or esters, alkyl aryl sulfonates, polyethylene oxide ethers of fatty alcohol and the polyoxyethylene ethers of alkyl phenols. All of the samples of compounds within these varieties that have been tested have been found to possess adequate detergency and wetting properties for the broad needs of this invention. However, one limited group of materials has been found to have peculiar advantages for the present use, apparently drawing all of the other components to a maximum level of functional cooperation. This group is the fatty alcohol, polyoxyethylene ether sulfate containing an average of about 2.5–3.5 mols of ethylene oxide. Of these, compounds having the higher amount of ethylene oxide are preferred, one example being sold under the trade name Sipon ES and known to be sodium lauryl ether sulfate containing an average of 3.5 moles of ethylene oxide. The amount of surface-active agent can vary between about 0.05–0.5 percent by weight with about 0.1–0.25 percent being preferred.

In accordance with the present invention, there is incorporated into the basic cleaning composition formulated along the preceding lines, a small but effective amount of an alkali-metal polyphosphate, sometimes referred to in the art as "a molecularly dehydrated phosphate." Examples of such polyphosphates include sodium tripolyphosphate, tetra-sodium pyrophosphate and sodium hexametaphosphate, of which tetrasodium pyrophosphate is preferred. Good results can be achieved using an amount of polyphosphate of about 0.005–0.5% by weight and preferably not in excess of about 0.2%. As the cation of these, salts, sodium and potassium are believed to be of substantially equal effectiveness.

For optimum results, it is advisable to replace a proportion of the polyphosphate with a fugitive alkaline material, the notable example of which is ammonia. While the use of the polyphosphate constitutes an effective solution to the problem of prior art cleaning compositions, the best practice is to maintain the level of solids in the composition as low as possible, consistent with the product properties, if a visible film of residual material after cleaning is to be avoided. Where the polyphosphate is utilized alone, the amount required for a high degree of effectiveness against grease film may result in the occurrence of some residual spotting of the surface being cleaned. A secondary aspect of this invention is the discovery that the amount of polyphosphate salt can be reduced below the level at which any spotting takes place without concomitant reduction in the detergent action if a small amount of a fugitive alkaline agent, such as ammonia, is present. A suitable amount, calculated on the basis of $NH_3$, is about 0.0005–0.2% and about 0.015–0.2% and about 0.015–0.060% is preferred. In lieu of ammonia, morpholine can be used in the amount of about 0.1–0.3%. Being volatile, these materials, after contributing the desirable supplementation of the polyphosphate, evaporate from the surface being cleaned and cannot become a part of any residue. A proportion of ammonia exceeding about 0.2–0.3% tends to cause release of gaseous ammonia to the atmosphere to an extent that may be objectional to some persons.

An important feature of this invention, alluded to only in passing previously, is the nature of the aqueous component of the present compositions, which component makes up the balance over and above those already enumerated and others whose presence is optional. In order to accommodate the low order of solids, as supplied mainly by the phosphate salt and surface-active agent, needed for substantial freedom of residual material but without deterioration in cleaning effectiveness, it has been found that the aqueous component should be made up of soft water. For present purposes, soft water may be defined as water containing not substantially more than about 1 grain hardness per gallon. Various ways are available for treating tap or plant water to remove the calcium and magnesium ions causing hardness. These include, among others, the addition to the water of lime plus soda ash or trisodium phosphate followed by settling and filtering, ion exchange by contact with an exchange material, such as zeolite, and deionization by means of a permselective membrane. The particular technique utilized appears of little significance so long as the requisite level of softness is achieved.

The evaluation of the performance of the present compositions on a quantitative basis presents definite complications; overall performance includes properties such as lubricity which is difficult to measure in the present context, as well as certain subjective considerations. However, it has been possible to devise an experimental procedure for evaluating detergency, especially with respect to an oil film, which has been found to have generally good correlation with results obtained in practice. The experimental data set forth in the following tabulation, which will serve in the nature of working examples of the practice of the present invention, was obtained in the course of the following procedure. A 1% solution of beef fat in hexane is prepared, sprayed on a microscope slide and allowed to dry, after which the slide is wiped gently several times with paper towelling to remove excess fat and leave a thin uniform grease film on the surface of the slide. A drop of the cleaning composition composed as indicated in the table is then placed on the surface of the slide bearing the film and allowed to remain in contact with the film for a predetermined number of seconds, as indicated in the table, after which the slide is shaken by hand to remove the composition and then flushed gently with deionized water. The area of the slide in contact with the composition is then examined visually for completeness of removal of the grease film and the gross results of this observation are recorded in the table. The balance of the composition is soft water, as defined above.

TABLE I.—EFFECT ON AGED GREASE FILM BY IMPROVED COMPOSITION

[Film Aged Ten Days at Room Temperature]

| Percent Surfactant | Percent NH$_3$ | Percent Polyphosphate | Percent Solvent Mixture [2] | Contact Time, Sec. | Extent of Film Removal |
|---|---|---|---|---|---|
| | | | 8.4 | 30 | Poor. |
| [1] 0.25 | 0.056 | | 8.4 | 30 | Slight poor. |
| [1] 0.25 | | 0.1 | 8.4 | 30 | Partial, fair. |
| [1] 0.25 | | 0.2 | 8.4 | 30 | Do. |
| [1] 0.25 | | 0.3 | 8.4 | 30 | Do. |
| [1] 0.25 | 0.056 | 0.3 | 8.4 | 30 | Complete. |

[Film Aged Sixteen Days at Room Temperature]

| Percent Surfactant | Percent NH$_3$ | Percent Polyphosphate | Percent Solvent Mixture [2] | Contact Time, Sec. | Extent of Film Removal |
|---|---|---|---|---|---|
| [1] 0.25 | 0.056 | | 8.4 | 30 | Slight. |
| [1] 0.25 | | 0.1 | 8.4 | 30 | Almost complete. |
| [1] 0.25 | 0.056 | 0.1 | 8.4 | 30 | Complete. |
| [3] 0.1 | 0.056 | | 8.4 | 30 | Slight. |
| [3] 0.1 | 0.056 | 0.1 | 8.4 | 15 | Almost complete. |
| [3] 0.1 | 0.056 | 0.1 | 8.4 | 30 | Do. |

[1] Surfactant is sodium lauryl sulfate.
[2] Solvent mixture consists of 30% glycol monoethyl ether, 24% diethylene glycol monoethyl ether, and 46% isopropyl alcohol.
[3] Surfactant is nonyl phenol polyethylene glycol ether (Tergitol NP-35) known in the art to be prepared from 15 moles of ethyleneoxide.

In order to confirm the critical contribution of the polyphosphate salt in a somewhat different approach, a similar line of experiments was run on fat films aged 24 days at room temperature at a contact time of 30 seconds with a composition containing 0.1% Tergitol NP-35, the solvent mixture of subscript 2 above, 0.056% NH$_3$, soft water, and varying amounts of sodium tripolyphosphate as indicated below:

TABLE II.—EFFECT OF VARYING PROPORTION OF POLYPHOSPHATE SALT

| Percent polyphosphate: | Extent of film removal |
|---|---|
| 0.00 | Slight. |
| 0.005 | Almost complete. |
| 0.01 | Complete. |
| 0.025 | Do. |
| 0.050 | Do. |
| 0.100 | Do. |

The equivalence of various polyphosphate salts for the purposes of this invention is shown by the following table summarizing the results obtained in the same manner as in Table II, except that the fat films are aged 30 days at room temperature, and the proportion of ammonia is reduced to 0.014%.

TABLE III.—COMPARISON OF VARIOUS POLYPHOSPHATES

| Percent Polyphosphate | Type Polyphosphate | Contact Time, Sec. | Extent of Film Removal |
|---|---|---|---|
| | | 30 | Slight. |
| .01 | Sodium Tripolyphosphate | 15 | Complete. |
| .01 | Tetrasodium Pyrophosphate | 15 | Do. |
| .01 | Sodium Hexametaphosphate | 15 | Almost complete. |

As mentioned above, the experimental data available indicates that the loss in fat removal effectiveness of an aqueous solution of surfactant on the addition thereto of the alcohol-glycol solvent system is due to the decrease in solubility of the surfactant in the system. Furthermore, as previously mentioned, this solubility is re-established by adding the polyphosphate to the system and that this further enhanced by adding ammonia.

To establish this a series of solutions was prepared, as indicated below, the percentages being given as percent by weight.

TABLE IV

| Formula Number | Percent Sodium lauryl sulfate (SLS) | Percent Solvent A | Percent Soft Water | Percent Tetrasodium pyrophosphate (TSPP) | Percent NH$_4$OH (Ammonia) 96° Bé. |
|---|---|---|---|---|---|
| 1 | 0.25 | | 99.75 | | |
| 2 | 0.25 | 8.34 | 91.41 | | |
| 3 | 0.25 | | 99.74 | 0.01 | |
| 4 | | 8.34 | 91.65 | 0.01 | |
| 5 | 0.25 | 8.34 | 91.40 | 0.01 | |
| 6 | 0.25 | 8.34 | 91.30 | 0.01 | 0.10 |
| 7 | 0.25 | 8.34 | 91.31 | | 0.10 |

Solvent A= A mixture containing: (a) isopropanol 46%, (b) ethyl ether of ethylene glycol 30%, and (c) ethyl ether of diethylene glycol 24%.

Large 10″ x 12″ glass plates were cleaned, and a beef fat film applied. After ageing in the open air about 48 hours, they were used as follows:

(1) Two-drop puddles of the formula being tested were placed in quick succession across the 10″ dimension of the glass on the side containing the fat film.

(2) Thirty seconds after placing the first puddle, it was rinsed off with a small stream of deionized water. The remaining puddles were washed off in like manner in the same order in which they were applied. In this manner a contact time of approximately 30 seconds for each puddle was obtained. After completing the tests, the plates were allowed to air dry at least 30 minutes before examining them.

Close examinations of all the groups of cleaned areas were made, and rated as shown in Table V. A rating of 1 is best, 2 next best, etc. The percentages listed are estimated.

TABLE V

| Formula Number | Description of Formula | Rating | Estimated Percent Fat Removal |
|---|---|---|---|
| 3 | SLS, TSPP, Soft Water | 1 | 98-100 |
| 1 | SLS, Soft Water | 2 | 96-99 |
| 6 | Solvent A, TSPP, Ammonia, SLS, Soft Water. | 3 | 70-75 |
| 7 | Solvent A, SLS, Ammonia, Soft Water. | 4 | 65-70 |
| 5 | Solvent A, TSPP, SLS, Soft Water | 5 | 60-65 |
| 4 | Solvent A, TSPP, Soft Water | 6 | 20-25 |
| 2 | Solvent A, SLS, Soft Water | 7 | 10-15 |

This clearly establishes that the solvent, SLS and water solution is the least efficient in fat removal (10-15%). It also shows that it is possible to increase the efficiency of this by adding TSSP to 60-65% and that it may further be increased to 65-70% by the further addition of ammonia.

In addition, the following solutions were prepared and tested for the Tyndall effect that it might exhibit. Samples of the solutions were exposed to a Tyndall beam, and the degree of haze seen in each solution was noted and rated. The solution which had the greatest degree of haze, and consequently containing the most undissolved material was rated as 10. The other ratings were made as related to 10 as a standard. Thus, a sample rated as 5 would have a degree of haze that was one-half of that given for the standard which was rated as 10.

TABLE VI

| Formula No. | Percent Sodium lauryl sulfate (SLS) | Percent Solvent A | Percent Soft Water | Percent Tetra-sodium pyrophosphate (TSPP) | Percent $NH_4OH$ 96° Bé. Ammonia | Haze Rating |
|---|---|---|---|---|---|---|
| A | | 8.34 | 91.66 | | | 0 |
| 1 | 0.25 | | 99.75 | | | 1-2 |
| 2 | 0.25 | 8.34 | 91.41 | | | 10 |
| 5 | 0.25 | 8.34 | 91.40 | 0.01 | | 6-7 |
| 6 | 0.25 | 8.34 | 91.30 | 0.01 | 0.10 | 4 |

Solvent A=A mixture containing: (a) isopropanol 46%, (b) ethyl ether of ethylene glycol 30%, and (c) the ethyl ether of diethylene glycol 24%.

Table VI above demonstrates that the solubility of the surfactant in water, as measured, by the Tyndall effect is clearly reduced when mixed with the solvent system (see entry regarding Formula 2 and compare with entries for Formula A and Formula 1). It also shows that this can be increased by the addition of TSPP and still further increased by the addition of ammonia (see entries regarding Formulas 5 and 6).

It will further be noted that the data in Table VI is correlated with the data in Table V. The fat removal efficiency of the composition of Table V can be seen to correspond to the solubility of the surfactant in the system as measured in Table VI.

The following examples of complete, specific embodiments of satisfactory effectiveness will serve to illustrate further the practice of this invention. In these examples, as in those mentioned previously, all proportions are by weight unless otherwise indicated.

Example 1

| | | |
|---|---|---|
| Isopropanol | percent | 3.84 |
| Methyl ether of dipropylene glycol | do | 2.00 |
| Sodium lauryl sulfate | do | 0.15 |
| 28% $NH_4OH$ | do | 0.20 |
| Sodium tripolyphosphate | do | 0.15 |
| Dye solution | cc | 1.20 |
| Perfume | drops | 2 |

Soft water to make 100.00 gms.

Example 2

| | | |
|---|---|---|
| Ethanol | percent | 4.00 |
| Butyl ether of ethylene glycol | do | 1.00 |
| Sodium lauryl sulfate | do | 0.10 |
| Tetra-sodium pyrophosphate | do | 0.01 |
| 28% $NH_4OH$ | do | 0.05 |
| Dye solution | cc | 1 |
| Perfume | percent | 0.01 |

Soft water to make 100.00 gms.

In the preceding example, isopropanol or normal propanol may be used in place of ethanol with substantially equivalent results.

Example 3

| | | |
|---|---|---|
| Isopropanol | percent | 4.00 |
| Butyl ether of ethylene glycol | do | 1.00 |
| Sodium lauryl ether sulfate (Sipon ES) | do | 0.10 |
| Tetra-sodium pyrophosphate | do | 0.01 |
| 28% $NH_4OH$ | do | 0.05 |
| Dye solution | cc | 1 |
| Perfume | percent | .01 |

Soft water to make 100.00 gms.

Example 4

| | | |
|---|---|---|
| Isopropanol | percent | 3.84 |
| Methyl ether of propylene glycol | do | 2.50 |
| Isopropyl ether of ethylene glycol | do | 2.00 |
| Perfume | do | .02 |
| Sodium lauryl ether sulfate | do | 0.10 |
| Tetra-sodium pyrophosphate | do | .01 |
| 28% $NH_4OH$ | do | 0.10 |
| Dye solution | cc | 1 |

Soft water to make 100.00 gms.

Example 5

| | | |
|---|---|---|
| Ethanol | percent | 4.0 |
| Isopropanol | do | 2.5 |
| Ethylene glycol | do | 1.0 |
| Methyl ether of dipropylene glycol | do | 1.0 |
| Sodium lauryl ether sulfate | do | 0.1 |
| Tetra-sodium pyrophosphate | do | 0.01 |
| Dye solution | cc | 1 |
| 28% $NH_4OH$ | percent | 0.10 |

Soft water to make 100.00 gms.

Example 6

| | | |
|---|---|---|
| Isopropanol | percent | 4.00 |
| Methyl ether of propylene glycol | do | 1.00 |
| 28% $NH_4OH$ | do | 0.10 |
| Sodium lauryl ether sulfate | do | 0.1 |
| Tetra-sodium pyrophosphate | do | 0.01 |
| Perfume | do | .02 |
| Dye solution | cc | 1 |

Soft water to make 100.00 gms.

In the preceding example, the amount of the methyl ether of propylene glycol can be increased in .25% increments up to a total of 2.50% with substantially equivalent results.

Example 7

| | |
|---|---|
| Ethanol | percent 4.00 |
| Methyl ether of propylene glycol | do 2.00 |
| Sodium lauryl ether sulfate | do 0.10 |
| 28% NH$_4$OH | do 0.10 |
| Tetra-sodium pyrophosphate | do 0.01 |
| Dye solution | cc 1 |
| Perfume | percent 0.02 |
| Soft water to make 100.00 gms. | |

In the preceding example, the amount of methyl ether of propylene glycol can be increased to 3.0% with substantially equivalent results.

Example 8

| | |
|---|---|
| Iosprapanol | percent 3.80 |
| Normal propanol | do 3.50 |
| Butyl ether of ethylene glycol | do 1.00 |
| 28% NH$_4$OH | do 0.10 |
| Sodium lauryl ether sulfate | do 0.10 |
| Tetra-sodium pyrophosphate | do 0.01 |
| Dye solution | cc 1 |
| Perfume | percent 0.02 |
| Soft water to make 100.00 gms. | |

Example 9

| | |
|---|---|
| Normal propanol | percent 3.84 |
| Methyl ether of propylene glycol | do 2.50 |
| Butyl ether of ethylene glycol | do 1.00 |
| 28% NH$_4$OH | do 0.10 |
| Sodium lauryl ether sulfate | do 0.10 |
| Tetra-sodium pyrophosphate | do 0.01 |
| Dye solution | cc 1 |
| Perfume | percent 0.02 |
| Soft water to make 100.00 gms. | |

Example 10

| | |
|---|---|
| Isopropanol | percent 1.00 |
| Butyl ether of ethylene glycol | do 1.75 |
| 28% NH$_4$OH | do 0.10 |
| Sodium lauryl ether sulfate | do 0.10 |
| Tetra-sodium pyrophosphate | do 0.01 |
| Dye solution | cc 1 |
| Perfume | percent 0.02 |
| Soft water to make 100.00 gms. | |

The compositions of this invention are intended to be used in the manner as those of the same type already known in the art. Thus, they are normally applied to this surface to be cleaned by spraying, preferably with an atomizing nozzle, in order to get good coverage, although they can be applied from a cloth if desired. Thereafter, the surface is wiped or polished with paper toweling, soft cloth or other non-abrasive absorbent material.

It will be appreciated that in addition to the ingredients discussed in detail in the course of this description, the present compositions can include others known in the art to be useful for various functions which, while desirable, are not critical to their performance. Among these may be mentioned perfumes and coloring or dyes as appears in the examples, as well as others obvious to the art. For this reason, where the phrase "consisting essentially of" appears, it will be understood as intended to exclude the presence of other materials in such amounts as to interfere to a substantial extent with the properties and the characteristics possessed by the composition set forth, but to permit the presence of other materials in such amounts as not to affect adversely said properties and characteristics to a substantial extent. Moreover, it is hardly necessary to state the obvious fact that various changes and modifications can be made in the embodiment described above by the exercise of ordinary skill in the art without departing from the spirit of the invention.

What is claimed is:

1. A cleaning composition for surfaces of glass consisting essentially of about 0.5–5% of at least one lower aliphatic monohydric alcohol having about 2–4 carbon atoms and a boiling point not in excess of about 100° C.; at least one higher boiling polar organic solvent selected from the group consisting of a glycol having about 2–6 carbon atoms and a 1–4 carbon alkyl ether of a glycol containing a total of about 3–8 carbon atoms and having a boiling point not in excess of about 250° C. in the amount of about 0.5–5%; about 0.05–0.5% of a compatible surface-active agent selected from the group consisting of fatty alcohol sulfates containing from 8–18 carbons, polyoxyethylene ethers of alkyl phenols, and fatty alcohol polyoxyethylene ether sulfates; about 0.005–0.5% of an alkali-metal polyphosphate selected from the group consisting of alkali-metal tripolyphosphate, tetra-alkali-metal pyrophosphate, and alkali-metal hexa-metaphosphate; ammonia in amount of from 0.005 to 0.2%; and the balance soft water, all percentages being by weight.

2. A composition as in claim 1 wherein the amount of polyphosphate does not exceed about 0.2%.

3. A composition as in claim 2 including at least about 1% of said lower alcohol, at least about 1% of each such higher boiling polar solvent, at least about 0.1% of said surface-active agent, at least about 0.01% of said polyphosphate, and about 0.015–0.060% ammonia.

4. A composition according to claim 3 wherein said alkali-metal polyphosphate is tetrasodium pyrophosphate.

5. A composition according to claim 4 wherein the surface-active agent is sodium lauryl sulfate.

6. A composition according to claim 5 wherein the lower aliphatic monohydric alcohol is isopropanol and said higher boiling polar organic solvent is a mixture of the ethyl ether of ethylene glycol and the ethyl ether of diethylene glycol.

7. A composition according to claim 5 wherein the lower aliphatic monohydric alcohol is isopropanol and said higher boiling polar organic solvent is a mixture of the methyl ether of propylene glycol and the n-butyl ether of ethylene glycol.

8. A composition according to claim 4 wherein the surface-active agent is sodium lauryl ether sulfate.

9. A composition according to claim 8 wherein the lower aliphtic monohydric alcohol is isopropanol and said higher boiling polar organic solvent is a mixture of the ethyl ether of ethylene glycol and the ethyl ether of diethylene glycol.

10. A composition according to claim 8 wherein said lower aliphatic monohydric alcohol is isopropanol and said higher boiling polar organic solvent is a mixture of the methyl ether of propylene glycol, and the n-butyl ether of ethylene glycol.

11. A composition as in claim 1 wherein the combined proportion of said alcohol and said higher boiling solvent does not exceed about 6% and is comprised by about 30–75% of said alcohol.

12. A composition as in claim 11 wherein said surface-active agent is a fatty alcohol polyoxyethylene ether sulfate.

References Cited

UNITED STATES PATENTS

| | | |
|---|---|---|
| 2,313,425 | 3/1943 | Flaxman. |
| 2,386,106 | 10/1945 | Gangloff. |
| 2,524,380 | 10/1950 | Flaxman. |
| 3,095,381 | 6/1963 | Tinnon et al. |

LEON D. ROSDOL, Primary Examiner

STANLEY D. SCHWARTZ, Assistant Examiner

U.S. Cl. X.R.

252—139, 162, 171, 364

UNITED STATES PATENT OFFICE
CERTIFICATE OF CORRECTION

Patent No. 3,463,735                                                August 26, 1969

Melvin E. Stonebraker et al.

It is certified that error appears in the above identified patent and that said Letters Patent are hereby corrected as shown below:

In the heading to the printed specification, line 4, "Syracuse" should read -- Sycamore --. Column 4, line 10, "sulfonated" should read -- sulfated --; line 22, "mols" should read -- moles --. Column 6, Table IV, heading of the last column, "96°Bé" should read -- 26°Bé --. Column 7, line 16, "TSSP" should read -- TSPP --; same column 7, Table VI, heading of column 6, "96°Bé" should read -- 26°Bé --.

Signed and sealed this 7th day of July 1970.

(SEAL)
Attest:

EDWARD M. FLETCHER, JR.                            WILLIAM E. SCHUYLER, JR
Attesting Officer                                        Commissioner of Patents